United States Patent
Droz et al.

(10) Patent No.: US 9,618,742 B1
(45) Date of Patent: Apr. 11, 2017

(54) ROTATABLE MIRROR ASSEMBLIES

(71) Applicant: Google Inc., Mountain View, CA (US)

(72) Inventors: Pierre-yves Droz, Mountain View, CA (US); Drew E. Ulrich, Mountain View, CA (US)

(73) Assignee: Google Inc., Mountain View, CA (US)

( * ) Notice: Subject to any disclaimer, the term of this patent is extended or adjusted under 35 U.S.C. 154(b) by 295 days.

(21) Appl. No.: 13/790,934

(22) Filed: Mar. 8, 2013

(51) Int. Cl.
*G01C 3/08* (2006.01)
*G02B 26/12* (2006.01)
*G01S 17/02* (2006.01)

(52) U.S. Cl.
CPC .............. *G02B 26/12* (2013.01); *G01S 17/02* (2013.01)

(58) Field of Classification Search
CPC ....... G01C 15/002; G01S 17/89; G01S 17/88; G02B 26/0816; G02B 27/646
USPC ........................................ 356/4.01; 359/838
See application file for complete search history.

(56) References Cited

U.S. PATENT DOCUMENTS

| | | | |
|---|---|---|---|
| 3,622,221 A * | 11/1971 | Kossyk et al. .............. | 359/217.1 |
| 3,668,409 A * | 6/1972 | Tuhro et al. ................... | 250/236 |
| 3,790,277 A | 2/1974 | Hogan | |
| 3,824,000 A * | 7/1974 | Burns ................... | G02B 27/646 248/476 |
| 4,043,632 A | 8/1977 | Jeffery et al. | |
| 4,141,620 A | 2/1979 | Goshima et al. | |
| 4,601,554 A * | 7/1986 | Plante et al. ................... | 359/871 |
| 4,700,301 A | 10/1987 | Dyke | |
| 4,709,195 A | 11/1987 | Hellekson et al. | |
| 4,875,764 A * | 10/1989 | Marino et al. ................. | 359/849 |
| 4,966,427 A | 10/1990 | Parker | |
| 4,967,076 A * | 10/1990 | Schuhmacher .... | G06K 7/10693 235/462.39 |
| 4,993,823 A * | 2/1991 | Schaffer et al. .............. | 359/849 |
| 5,162,951 A * | 11/1992 | Sorce ............................ | 359/871 |
| 5,173,797 A * | 12/1992 | Zedekar et al. ........... | 359/212.1 |
| 5,202,742 A | 4/1993 | Frank et al. | |
| 5,687,017 A * | 11/1997 | Katoh ...................... | G02B 5/09 359/216.1 |
| 5,716,036 A | 2/1998 | Isobe et al. | |
| 5,742,068 A | 4/1998 | Dybdahl et al. | |
| 5,793,491 A * | 8/1998 | Wangler ................ | G01S 7/4802 356/398 |
| 5,864,391 A | 1/1999 | Hosokawa et al. | |
| 6,069,726 A * | 5/2000 | Hughes ....................... | 359/223.1 |
| 6,427,916 B1 * | 8/2002 | Ishii ......................... | G02B 5/09 235/462.39 |
| 7,089,114 B1 | 8/2006 | Huang | |
| 7,248,342 B1 | 7/2007 | Degnan | |
| 7,255,275 B2 | 8/2007 | Gurevich et al. | |

(Continued)

*Primary Examiner* — Luke Ratcliffe
*Assistant Examiner* — Vicente Rodriguez
(74) *Attorney, Agent, or Firm* — McDonnell Boehnen Hulbert & Berghoff LLP

(57) ABSTRACT

Rotatable mirror assemblies and light detection and ranging systems containing rotatable mirror assemblies are described herein. An example rotatable mirror assembly may include (1) a housing having a top end, a bottom end, and a longitudinal axis intersecting the top and bottom ends, and (2) a set of reflective surfaces, where each reflective surface in the set is coupled to the top end of the housing and the bottom end of the housing such that each reflective surface possesses limited freedom of movement with respect to the housing.

20 Claims, 9 Drawing Sheets

(56) References Cited

U.S. PATENT DOCUMENTS

| | | | |
|---|---|---|---|
| 7,901,090 B2 * | 3/2011 | Kao | G02B 7/1825 353/119 |
| 7,969,558 B2 | 6/2011 | Hall | |
| 8,000,181 B2 * | 8/2011 | Yamada | 369/44.11 |
| 2002/0015211 A1 | 2/2002 | Matsui et al. | |
| 2008/0174761 A1 | 7/2008 | Zhao | |
| 2008/0260312 A1 | 10/2008 | Nishino et al. | |
| 2011/0216304 A1 * | 9/2011 | Hall | 356/4.01 |
| 2012/0236379 A1 | 9/2012 | da Silva et al. | |

* cited by examiner

SECTION A-A

SECTION D-D

SECTION B-B

SECTION E-E

SECTION C-C

SECTION F-F

SECTION G-G

ROTATABLE MIRROR ASSEMBLIES

BACKGROUND

Unless otherwise indicated herein, the materials described in this section are not prior art to the claims in this application and are not admitted to be prior art by inclusion in this section.

In some optical scanning systems, such as a Light Detection and Ranging (LIDAR) system, a rotating, polygonal mirror is used to steer light that is transmitted by the system. The steered light may encompass a field of view, and may reflect off of objects that are within the field of view. The reflected light may return to the system and be received by a signal receiver, and in this way, provide the system with information, such as distance information, about objects within the field of view.

In some emerging applications, such as autonomous vehicle operation, an example LIDAR system may be exposed to external inertial forces and environmental changes, among other disruptive forces. For instance, the rotating mirror within the LIDAR system of an autonomous vehicle may be affected by inertial forces arising from the movement of the vehicle, which may affect the balance and rotation of the mirror. Further, the mirror may experience thermal expansion based on changes in the ambient temperature, which may crack or deform the mirror depending on the construction of the mirror assembly. Other examples may also exist.

SUMMARY

Accordingly, an improved rotatable mirror assembly is needed that is, for instance, lightweight and tolerant of environmental changes. Disclosed herein are such rotatable mirror assemblies.

An example assembly may be polygonal in shape and may include a housing and a set of reflective surfaces. The reflective surfaces may be coupled to the housing such that they possess limited freedom of movement. For example, the reflective surfaces may be coupled to the housing by clipping them into place or by inserting them into slots in the housing. Other methods of mounting the surfaces are also possible, so long as they allow enough freedom of movement for the components of the mirror assembly to thermally expand (within expected ranges) without adversely affecting the mirror assembly's reflective properties.

In one example embodiment, an apparatus is provided. The apparatus may include (1) a housing including a top end, a bottom end, and a longitudinal axis intersecting the top and bottom ends, and (2) a set of reflective surfaces, where each reflective surface in the set is coupled to the top end of the housing and the bottom end of the housing such that each reflective surface possesses limited freedom of movement with respect to the housing.

In another aspect, a LIDAR system is provided. The LIDAR system may include (1) a mirror assembly, the mirror assembly including (a) a housing comprising a top end, a bottom end, and a longitudinal axis intersecting the top and bottom ends, and (b) a set of reflective surfaces, where each reflective surface in the set is coupled to the top end of the housing and the bottom end of the housing such that each reflective surface possesses limited freedom of movement with respect to the housing, (2) at least one laser diode configured to emit a laser signal, where the mirror assembly is positioned to redirect the laser signal, and (3) at least one signal receiver configured to receive a reflected laser signal, where the reflected laser signal corresponds to the emitted laser signal.

In another aspect, another LIDAR system is provided. The LIDAR system may include (1) one and only one mirror, the mirror defining one and only one plane and further including (a) a top end, (b) a bottom end, (c) two opposing reflective surfaces, and (d) a longitudinal axis intersecting the top and bottom ends, where the longitudinal axis is co-planar with the plane of the mirror, and where the top and bottom ends of the mirror are adapted to engage a set of bearings for rotating the mirror about the longitudinal axis, (2) at least one laser diode configured to emit a laser signal, where the mirror is positioned to redirect the laser signal, and (3) at least one signal receiver configured to receive a reflected laser signal, where the reflected laser signal corresponds to the emitted laser signal.

These as well as other aspects, advantages, and alternatives, will become apparent to those of ordinary skill in the art by reading the following detailed description, with reference where appropriate to the accompanying drawings.

DETAILED DESCRIPTION

Figure 1:
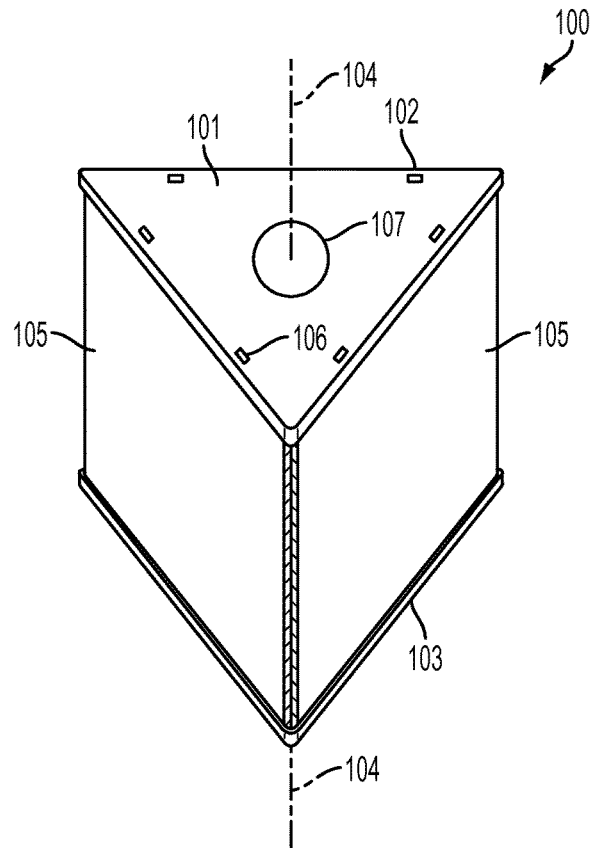
FIG. 1 shows a perspective view of an example polygonal mirror assembly.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized and other changes may be made without departing from the spirit or scope of the subject matter presented herein. It will be readily understood that the aspects of the present disclosure, as generally described below and illustrated in the figures, can be arranged, substituted, combined, separated, and designed in a wide variety of different configurations, all of which are contemplated herein.

I. POLYGONAL MIRROR ASSEMBLIES

A. Overview

An example embodiment of a polygonal mirror assembly may include a housing including a top end, a bottom end, and a longitudinal axis that intersects the top and bottom ends. The top and bottom ends of the housing may be polygonal in shape, with each side of the polygon corresponding to a reflective surface of the mirror assembly. However, other shapes are also possible for the top and bottom ends of the housing. The ends may be, for example, circular. Moreover, the ends need not have the same geometry as each other. As long as the ends are configured to be coupled to the reflective surfaces, as further described below, they may take any suitable shape.

The top and bottom ends of the housing may also include a centrally-located hub having means for attaching the example polygonal mirror assembly to a frame or other structure that may support the assembly. The hub may also include a set of bearings to enable the rotation of the polygonal mirror assembly about its longitudinal axis. A means for rotating the assembly may alternatively or additionally be included on the frame or other structure that supports the assembly.

In addition to the housing, an example polygonal mirror assembly may include a set of reflective surfaces, where each reflective surface defines a respective plane. The reflective surfaces may be glass mirrors, a reflective plastic or metal, or any other material or combination of materials capable of the necessary light reflection. Each of the reflective surfaces may be coupled to the top and bottom ends of the housing such that each reflective surface possesses limited freedom of movement with respect to the housing.

The example polygonal mirror assemblies described herein may be exposed to varying ambient temperatures, for instance, when implemented in an example LIDAR system of an autonomous vehicle. In these situations, the reflective surfaces may thermally expand and contract at a different rate than the housing if the housing is made from a dissimilar material. Further, even components made from similar materials may thermally expand and contract at normal or oblique angles to one another. In either case, if the coupling of the reflective surfaces to the housing is rigid, providing no freedom of movement, the resultant forces may strain the reflective surfaces. Rigid connections may be formed, for example, through the use of some adhesives, or through the use of some fasteners such as screws. In such a connection, the strain resulting from any thermal expansions may cause the reflective surfaces to deform and/or crack.

For these reasons, some freedom of movement for the reflective surfaces may be desirable in some applications. Accordingly, in some applications, the coupling of the housing and reflective surfaces may be accomplished in a non-rigid manner. In other words, the reflective surfaces, once coupled to the housing, may possess limited freedom of movement with respect to the housing. The freedom of movement is limited and would not allow, for instance, the reflective surfaces to become uncoupled from the housing during normal operation. Rather, in some applications, the freedom of movement may be small, on the order of several micrometers. Consequently, the coupling of the reflective surfaces to the housing may allow for enough freedom of movement for the different components of the mirror assembly to thermally expand and contract freely, under expected temperature conditions.

In one example, the coupling described above may be accomplished though a set of female coupling parts on the housing sized to receive the set of reflective surfaces. The female coupling parts may be recesses or indentations in the housing, or they may be perforations which extend through the entire top or bottom end of the housing, for example. Other female coupling parts are also possible. Correspondingly, each reflective surface may also include at least one male coupling part sized to engage the housing. The male coupling parts may take the shape of, for example, a protrusion extending from the reflective surface.

Accordingly, each reflective surface may be coupled to the housing by engaging each male coupling part within one of the female coupling parts. Further, each female coupling part on the housing may be sized slightly larger than each male coupling part on the reflective surfaces. Because each male coupling part possesses some limited freedom of movement within the larger-sized female coupling part, the entire reflective surface will possesses similar freedom of movement with respect to the housing.

The female and male coupling parts may be located on both the top and bottom ends of both the housing and reflective surfaces. In such an example, each reflective surface may be coupled to the housing by placing it in between the top and bottom ends of the housing, with the female and male coupling parts engaged as described. Further, the reflective surface may have an overall height that is slightly smaller than the distance between the top and bottom ends of the housing. In this way, the reflective surface, when coupled to the housing, may further possess the limited freedom to move in a vertical direction with respect to the housing.

For similar reasons, the reflective surfaces may be coupled to the housing such that their adjacent ends do not come into contact with one another. In other words, there may be a gap between one reflective surface and the next as they are coupled to the housing. This may allow for the thermal expansion of each reflective surface independent of the others.

The coupling of the reflective surfaces to the housing is not limited to the male and female coupling parts described above. Other structures may be used, such as snaps, clips, slots, or fasteners, so long as the connection allows the limited freedom of movement necessary to allow for thermal expansions under expected temperature conditions.

The limited freedom of movement of each reflective surface described above may allow for the unrestrained thermal expansion of the reflective surface. However, in this arrangement, the reflective surfaces may also be free to move with respect to the housing in response to other forces as well. Other forces may include the rotational forces of the mirror assembly itself, or external inertial forces. External inertial forces may be present in some applications such as a LIDAR system in an autonomous vehicle, for example. The acceleration and movement of the vehicle may give rise to such inertial forces acting on the mirror assembly.

Once coupled to the housing, the movement of a given reflective surface with respect to the housing may occur in one of three coordinate directions, two of which are parallel to the plane defined by the reflective surface, the other of which is perpendicular to the plane. It will be readily recognized that any movement of the reflective surface within its own plane may not affect the reflective geometry of the mirror assembly in most applications. This is true whether or not a given movement is uniform across the entire plane. For instance, different vertical movements between the right and left sides of a reflective surface (i.e., a differential movement) will result in a rotation of the surface about an axis perpendicular to its plane. However, in most applications, the rotational orientation of the reflective surface about this axis does not have an effect on the surface's reflective geometry.

On the other hand, movement of the reflective surface in a direction perpendicular to its plane may result in changes to the mirror assembly's reflective geometry. For instance, a uniform movement of the reflective surface perpendicular to its plane may change the distance from the reflective surface to the emitted light source, altering the path of the light after it is steered by the mirror assembly.

Moreover, although movements due to thermal expansion will occur uniformly across a reflective surface of uniform thickness, differential movements may nonetheless result from external forces acting on the mirror assembly. A differential movement between two opposing sides of a reflective surface perpendicular to its plane will result in a rotation about one or both axes parallel to the plane. Such rotations will change the angle of the reflective surface with respect to the emitted light source, and thus alter the mirror assembly's reflective geometry.

The changes to the reflective geometry of an example mirror assembly resulting from this type of movement may be relatively small due to the limited freedom of movement allowed by the coupling. In some embodiments, these changes in the reflective geometry of a given reflective surface may be within the tolerances of an example LIDAR system. For example, the components of the LIDAR system which receive and process the reflected light may be configured to tolerate variations in the reflective angles of the mirror assembly.

However, some example LIDAR systems may not be equipped to tolerate such variations. Consequently, it may be desirable to partially restrict the movement of each reflective surface with respect to the housing. In some embodiments, each reflective surface may be coupled to the top end of the housing and the bottom end of the housing such that each reflective surface may only move with respect to the housing in a direction parallel with its respective plane.

In the example described above using male and female coupling parts, the partial restriction of movement may be accomplished through the appropriate sizing of the respective coupling parts. For instance, the length and depth of a given female coupling part may be larger than the corresponding male coupling part, allowing movement in two directions. But the width of the female coupling part may be sized such that no movement of the male coupling part is possible in the third direction once the two are engaged. Other structures may also be used to similarly restrict the perpendicular movement of each reflective surface.

Because the thickness of each reflective surface may be relatively small when compared to its length or width, the expected thermal expansion of the surface in the direction perpendicular to its plane will also be relatively small compared to any thermal expansion parallel to its plane. For this reason, the perpendicular forces resulting from any thermal expansion may be so small that fully restricting the movement of the reflective surface in the perpendicular direction may not result in excessive strain or damage to the surface.

Alternatively, in some embodiments, movement of the reflective surfaces may be partially restricted through the use of at least one spring disposed between each reflective surface and the housing. The spring may exert a constant force on the back of each reflective surface, pushing outward from the housing. In this arrangement, the spring will resist movement of the reflective surface in the direction perpendicular to the plane of the reflective surface. The spring will also resist any rotations which might result from differential movements in the same direction. The force exerted by the spring should be such that it does not excessively stress the reflective surface, even when the spring is compressed due to the thermal expansion of the reflective surface under expected temperature conditions. A pair of example springs may apply a total pressure of, for instance, 10 pounds per square inch.

Although a spring has been described above, other structures may accomplish the same result. Flexible plastic or metal tabs may be used to apply a contestant force to the back of each reflective surface. Any similar structure that can apply a constant force and is sufficiently resilient is also possible.

In some applications, a lightweight mirror assembly may be desirable. For instance, a mirror assembly having less mass may require less energy to rotate and may therefore use less power. Additionally, a mirror assembly with less mass may generally be affected less by any external inertial forces that might act upon it. For instance, in autonomous vehicle applications, the acceleration, deceleration, or directional changes of the moving vehicle will exert an inertial force on the mirror assembly. This force may adversely affect the balance and/or rotation of the mirror and cause associated problems in an example LIDAR system. However, minimizing the mass of the mirror assembly will correspondingly minimize its momentum, and thereby minimize inertial forces such as those described above.

Accordingly, in some embodiments, the housing may be constructed of plastic or any other sufficiently durable, relatively lightweight material or combination of materials. Further, the reflective surfaces may similarly be constructed of any material or combination of materials having the desired weight and durability, provided that each surface is capable of the necessary light reflection. Coupling the housing and reflective surfaces as described above may further minimize the weight of the mirror assembly by avoiding the additional mass of adhesives or fasteners.

The angle of a reflective surface with respect to an emitted light source affects the path of the redirected light when it reflects off the surface. In some embodiments, each reflective surface in the mirror assembly may be coupled to the housing such that its respective plane is at a different angle to the longitudinal axis. For example, one reflective surface in the mirror assembly may be oriented parallel to the longitudinal axis. For a given light source emitting light perpendicular to the longitudinal axis, for instance, the parallel reflective surface will redirect the light perpendicular to the axis. Other reflective surfaces in the mirror assembly may each be coupled to the housing at a non-parallel angle to the longitudinal axis. For the same light source, these reflective surfaces would redirect light at either an inclining or declining angle from the axis. This effect may allow the mirror assembly to steer the light from a given light source through a larger field of view.

B. Example Embodiments

FIG. 1 shows a perspective view of an example polygonal mirror assembly 100. The assembly 100 includes a housing 101 having a top end 102, a bottom end 103, and a longitudinal axis 104 that intersects the top and bottom ends. In FIG. 1, a set of reflective surfaces 105 is coupled to the top and bottom ends 102, 103 of the housing 101, such that they possess limited freedom of movement with respect to the housing 101. A set of female coupling parts 106 sized to receive the reflective surfaces 105 are shown on the top end 102 of the housing 101.

In the example shown in FIG. 1, the ends 102, 103 of the housing 101 are triangular in shape, and each reflective surface 105 corresponds to a side of the triangle. Other shapes are also possible for the ends 102, 103. Further, the ends 102, 103 need not have a polygonal shape in order for the reflective surfaces 105 to be coupled to the housing 101 in a polygonal arrangement. The ends 102, 103 may be, for example, circular.

The example polygonal mirror assembly 100 shown in FIG. 1 also includes a centrally-located hub 107. The hub 107 is configured to attach the assembly 100 to a frame or other structure (not pictured) that will support the assembly 100. In the example shown in FIG. 1, the hub 107 is a stationary point of connection, and a set of bearings or other means for rotating the assembly 100 about its longitudinal axis 104 may be included on the frame or other structure that will support the assembly 100. Alternatively, in some examples, the hub 107 may include a set of bearings that enables the rotation of the polygonal mirror assembly 100.

Figure 2:
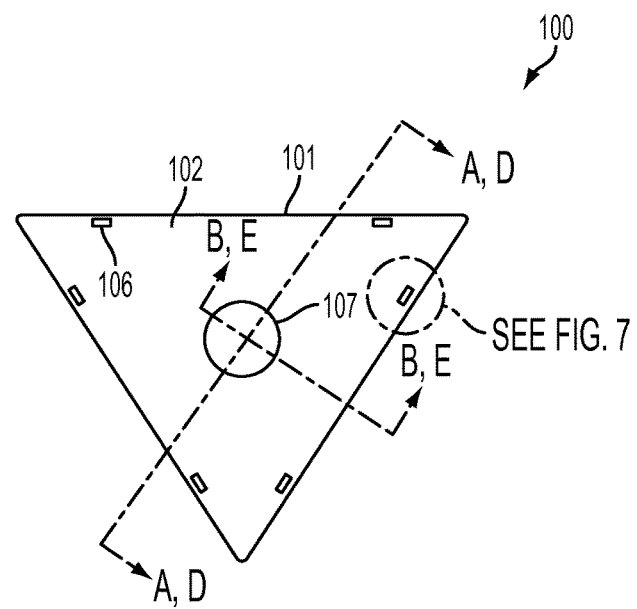
FIG. 2 shows a top view of an example polygonal mirror assembly.

FIG. 2 shows a top view of the example polygonal mirror assembly 100, where only the top end 102 of the housing 101 can be seen. The location of cross sectional views A-A and B-B are also indicated. These cross sections are pictured in FIGS. 3 and 4, respectively, and are described in further detail below. Also pictured in FIG. 2 on the top end 102 of the housing 101 are female coupling parts 106 sized to receive the reflective surfaces 105. Examples of the coupling of the housing 101 and the reflective surfaces 105 are shown in more detail in FIGS. 3 through 8 and are further described below.

Figure 3A:
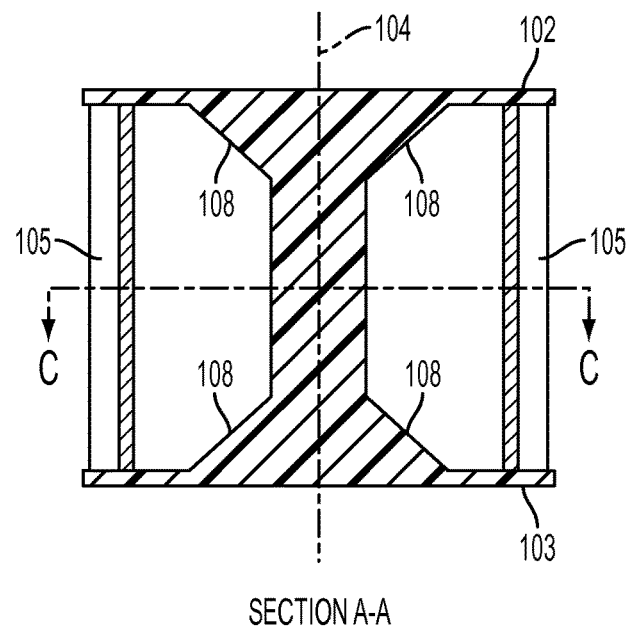
FIG. 3A shows cross section A-A, a side view taken from the middle of an example polygonal mirror assembly.

Cross section A-A, shown in FIG. 3A, is a side view taken from the middle of the example polygonal mirror assembly 100. The housing 101 is centered on its longitudinal axis 104, and the reflective surfaces 105 are located between the top and bottom ends 102, 103. The clear space between the top and bottom ends 102, 103 is slightly larger than the height of the reflective surfaces 105. This provides for a small vertical gap, on the order of several micrometers, and allows for the thermal expansion of the surfaces 105. The housing 101 also includes a set of flanges 108 near the top and bottom ends 102, 103 to provide structural support for the housing 101. The flanges 108 can be of any size or shape. In other examples, the flanges 108 may be omitted if the material used for the housing 101 is of sufficient strength to provide the necessary stability, or they may be replaced by other similar structures. Many configurations of the housing 101 are possible. Finally, FIG. 3A indicates the location of cross section C-C, which is shown in FIG. 5A and described below.

Figure 4A:
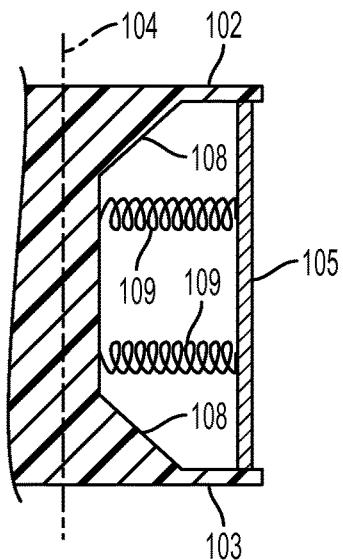
FIG. 4A shows cross section B-B, a partial side view taken from the middle of the example polygonal mirror assembly shown in FIG. 3A.

FIG. 4A shows cross section B-B of the example polygonal mirror assembly 100 shown in FIG. 3A. Cross section B-B is a partial side view taken from the middle of the example polygonal mirror assembly 100, perpendicular to cross section A-A. Again, the housing 101 is centered on its longitudinal axis 104, and the top and bottom ends 102, 103 engage the reflective surface 105. Two springs 109 are disposed between the housing 101 and the reflective surface 105, providing a constant force on the back of the reflective surface 105. Other examples may include more or less than two springs 109 per reflective surface 105, including some examples which may not employ any springs at all. Further, although a coiled spring 109 is shown, equivalent structures may also be used, such as flexible tabs or clips.

Figure 5A:
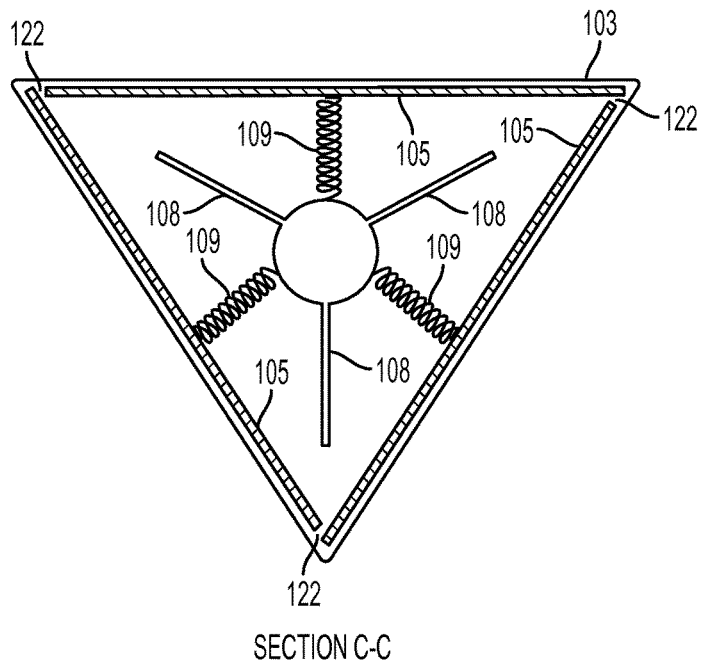
FIG. 5A shows cross section C-C, a top view taken from the middle of the example polygonal mirror assembly shown in FIG. 3A.

FIG. 5A shows cross section C-C, a top view taken from the middle of the example polygonal mirror assembly 100 shown in FIG. 3A. In FIG. 5A, the reflective surfaces 105 do not contact one another at their point of intersection. Rather, a small gap 122 exists between the ends of the reflective surfaces 105, on the order of several micrometers, to allow for thermal expansions of the materials. In this way, each reflective surface 105 does not contact any other reflective surface 105 in the set. Other examples may include a greater gap between the reflective surfaces 105. Finally, moving clockwise about the perimeter of the mirror assembly 100, the end of each reflective surface 105 overlaps the end of the next adjacent reflective surface 105, leaving a small gap 122. Other arrangements are also possible.

Figure 6:
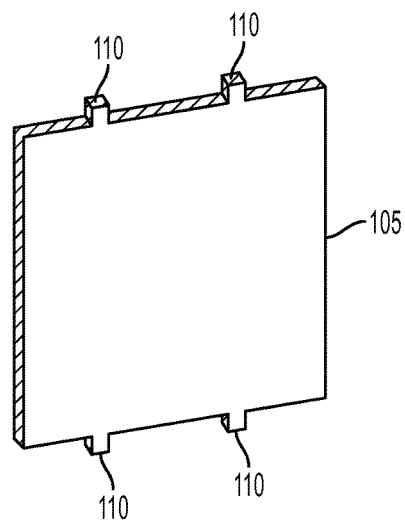
FIG. 6 shows a perspective view of an example reflective surface of an example polygonal mirror assembly.

FIG. 6 shows a typical reflective surface 105 of the example polygonal mirror assembly 100. The reflective surface 105 includes four male coupling parts 110 sized to engage the housing 101. The reflective surface 105 may include more or less male coupling parts 110 as necessary. Indeed, in some examples, the reflective surfaces 105 may not include any male coupling parts 110. In FIG. 6, the male coupling parts 110 take the form of protrusions which are extensions of the reflective surface 105. Other male coupling parts 110 are also possible.

Figure 7A:
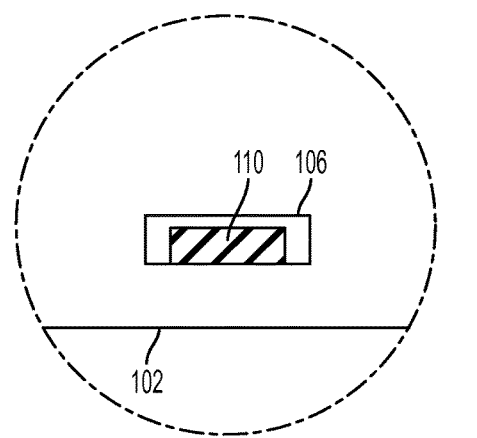
FIG. 7A shows a top view of an example female and male coupling part.

FIG. 7A illustrates a top view of an example female coupling part 106 located on the top end 102 of the housing 101. The corresponding male coupling part 110 from the reflective surface 105 is also shown. The female coupling part 106 is sized larger than the male coupling part 110, thus allowing for freedom of movement of the reflective surface 105. Because the female coupling part 106 is longer than the male coupling part 110, the reflective surface 105 may move laterally with respect to the housing 101. Further, because the female coupling part 106 is also wider than the male coupling part 110, the reflective surface 105 may move inward, closer to the center of the housing 101. However, the springs 109 will resist movement in this direction. In both cases, the movements allowed by the coupling are very small, on the order of several micrometers, as the freedom of movement need only be sufficient to allow for unrestrained thermal expansion under expected conditions.

Figure 7B:
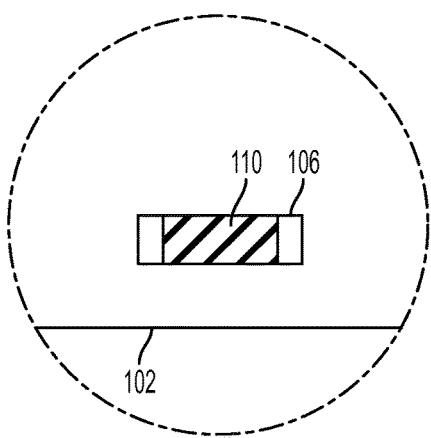
FIG. 7B shows a top view of another example female and male coupling part.

FIG. 7B shows another example of a female coupling part 106 that is sized larger than the male coupling part 110. Here, however, the width of the female coupling part 106 is substantially the same width as the male coupling part 110, providing no freedom of movement for the reflective surface 105 in the direction perpendicular to its plane. In this example, springs 109 may not be necessary between the housing 101 and the reflective surfaces 105.

In some examples, as described above with respect to FIG. 3A, a small gap exists between the reflective surfaces 105 and the top and bottom ends 102, 103, allowing for thermal expansion of the reflective surfaces 105 in the vertical direction. This freedom of movement remains present in the examples shown in both FIGS. 7A and 7B, where vertical movements of the reflective surface 105 with respect to the housing 101 are also not restricted by the interaction of the coupling parts. This is because the female coupling part 106 takes the shape of a perforation in the top end 102 of the housing 101, and does not constrain the male coupling part 110 in the vertical direction.

Figure 3B:
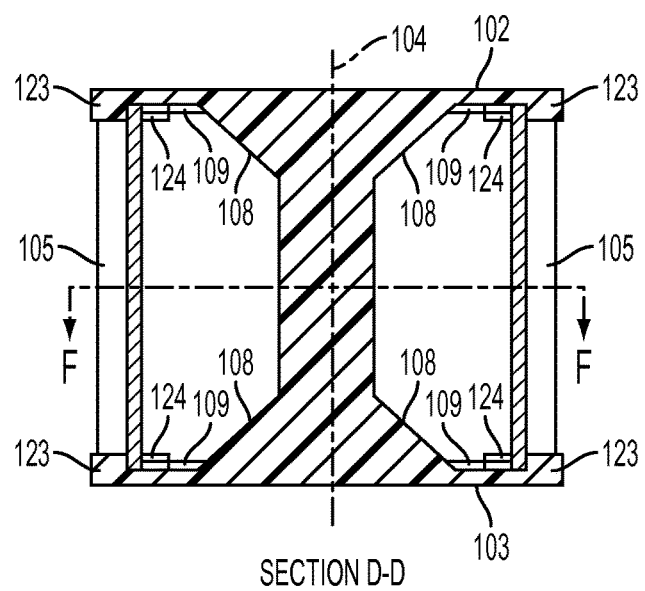
FIG. 3B shows cross section D-D, a side view taken from the middle of another example polygonal mirror assembly.

Another example polygonal mirror assembly 100 is shown in FIG. 3B. FIG. 3B shows cross section D-D, a side view taken from the middle of the example polygonal mirror assembly 100. However, the housing 101 has a different configuration than the example cross section A-A shown in FIG. 3A. Here, an edge 123 extends from both the top and bottom ends 102, 103 of the housing 101 for coupling the reflective surfaces 105 to the top and bottom ends 102, 103. Also shown in FIG. 3B is a spring 109, which takes the form of a straight piece of resilient metal wire held in the shape on an arc. The spring 109 is partially held in place by a block 124. FIG. 3B also indicates the location of cross section F-F, which is detailed in FIG. 5B and more clearly shows the arrangement of the spring 109 and block 124.

Figure 4B:
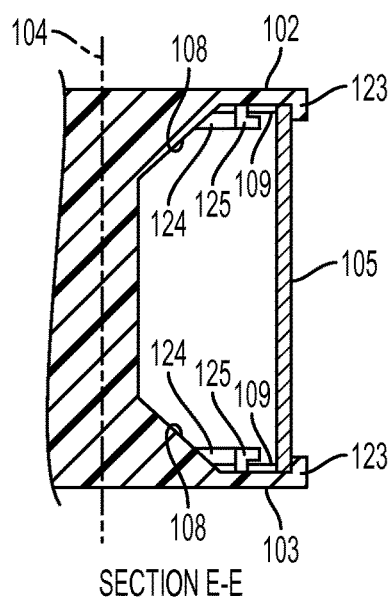
FIG. 4B shows cross section E-E, a partial side view taken from the middle of the example polygonal mirror assembly shown in FIG. 3B.

FIG. 4B shows cross section E-E of the example polygonal mirror assembly 100 shown in FIG. 3B. Cross section E-E is a partial side view taken from the middle of the example polygonal mirror assembly 100, perpendicular to cross section D-D. The housing 101 is centered on its longitudinal axis 104, and an edge 123 extends from both the top and bottom ends 102, 103 to engage the reflective surface 105. Two springs 109 are disposed between the housing 101 and the reflective surface 105, providing a constant force on the back of the reflective surface 105. The springs 109 are held in place by a set of blocks 124 and clips 125, which are further described below with respect to FIG. 5B. A portion of each clip 125 is positioned to restrict any vertical movements of the springs 109.

Figure 5B:
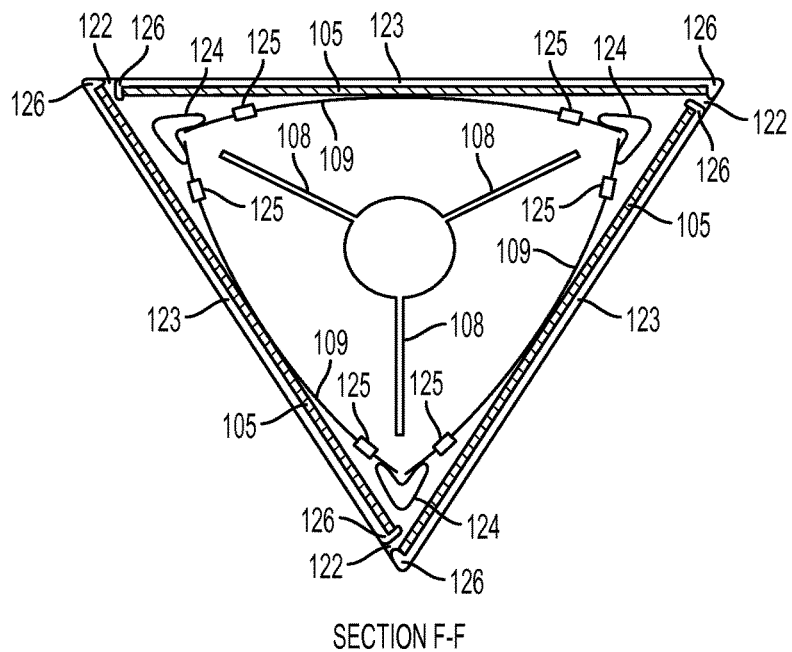
FIG. 5B shows cross section F-F, a top view taken from the middle of the example polygonal mirror assembly shown in FIG. 3B.

FIG. 5B shows cross section F-F, a top view taken from the middle of the example polygonal mirror assembly 100 shown in FIG. 3B. The edges 123 extending from the bottom end 103 of the housing 101 each include a pair of ends 126 shaped to contain the reflective surfaces 105. Each reflective surface 105 is sized slightly smaller than the clear distance between each pair of ends 126. The difference in size is on the order of several micrometers, in order to allow for the thermal expansion of the reflective surface 105 under expected conditions, as described in previous examples. Further, the ends 126 are situated such that there is a gap 122 between each reflective surface 105, and no reflective surface 105 contacts any other reflective surface 105 in the set.

FIG. 5B also shows three springs 109, each of them a straight piece of resilient metal wire held in place in the shape of an arc by a set of blocks 124 and clips 125. At each end of a given spring 109, the block 124 and clip 125 apply opposing forces to the spring 109, pushing the end of the spring 109 inward. Accordingly, the middle of the spring 109 is pushed outward, away from the middle of the housing 101 and toward the reflective surface 105. In addition to opposing the force provided by each block 124, each clip 125 also sits over the spring 109, preventing any vertical movement of the spring 109. Each spring 109 engages a reflective surface 105 and applies a constant force to the back of the reflective surface 105, coupling it to the top and bottom ends 102, 103 of the housing 101 in conjunction with the edge 123.

In the example shown in FIGS. 3B-5B, the edges 123 on the top and bottom ends 102, 103 of the housing 101 may be in addition to or in place of the female coupling parts 106 and male coupling parts 110 shown in FIGS. 3A-5A. As described, either example gives the reflective surfaces 105 the limited freedom of movement necessary to thermally expand. Other couplings not specifically described herein may also be used.

Figure 8A:
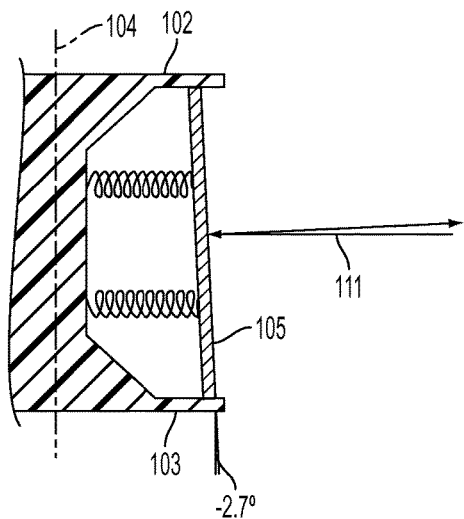
FIG. 8A shows a cross sectional view of a first example reflective surface coupled to a housing at a first angle.
Figure 8B:
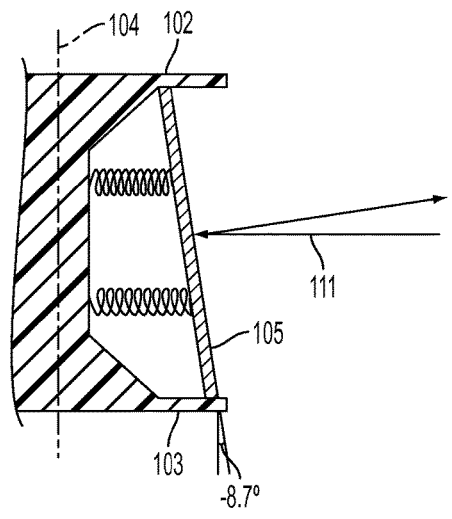
FIG. 8B shows a cross sectional view of a second example reflective surface coupled to a housing at a second angle.
Figure 8C:
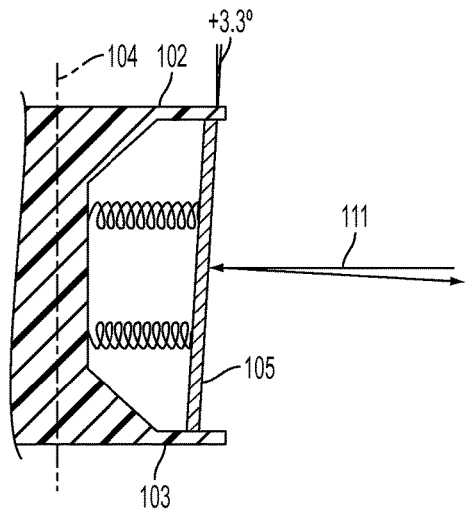
FIG. 8C shows a cross sectional view of a third example reflective surface coupled to a housing at a third angle.

FIGS. 8A-8C show an example of a polygonal mirror assembly 100 in which each of three reflective surfaces 105 are coupled to the housing 101 such that the plane defined by each reflective surface 105 is positioned at a different angle to the longitudinal axis 104. The differing angles of the reflective surfaces 105 in FIGS. 8A-8C may be accomplished by adjusting the coupling location on the housing 101. For example, female coupling parts 106 on either the top or bottom ends 102, 103 of the housing 101 may be moved closer to the center of the housing 101. In another example, the edges 123 extending from either the top or bottom ends 102, 103 of the housing 101 may be moved closer to the center of the housing 101.

In FIG. 8A, the reflective surface 105 is inclined at −2.7 degrees to the longitudinal axis 104. The emitted light 111 travels toward the reflective surface 105 and is then redirected, resulting in emitted light 111 traveling at an inclining angle away from the polygonal mirror assembly 100. Similarly, in FIG. 8B the reflective surface 105 is inclined at −8.7 degrees to the longitudinal axis 104. Again, the emitted light 111 travels toward the reflective surface 105 and is then redirected, resulting in emitted light 111 traveling away from the polygonal mirror assembly 100 at an inclining angle greater than that shown in FIG. 8A. Finally, in FIG. 8C the reflective surface 105 is inclined at +3.3 degrees to the longitudinal axis 104. Here, the emitted light 111 is redirected at a declining angle away from the polygonal mirror assembly 100. Other angles for coupling the reflective surfaces 105 to the housing 101 are also possible.

It should be understood that, while particular example embodiments of polygonal mirror assemblies are described above, these examples are provided for purposes of explanation only. Those of skill in the art will appreciate that various components, devices, and/or other elements may be added, removed, or interchanged without departing from the scope of the polygonal mirror assemblies described herein. The examples described herein should not be taken to be limiting.

II. SINGLE MIRROR ASSEMBLIES

A. Overview

In another embodiment, a mirror assembly may be composed of only a single mirror, where the mirror defines a single plane. The mirror may include top and bottom ends and two opposing reflective surfaces, arranged back-to-back. Further, the mirror may include a longitudinal axis that intersects both the top and bottom ends, and which is co-planar with the plane of the mirror.

An assembly having only a single mirror with two reflective surfaces, such as the example described above, may be desirable in some applications where maintaining minimal mass of the mirror assembly is of relative importance. In some single-mirror applications, a housing may not be necessary. Rather, the top and bottom ends of the mirror may be adapted to engage a set of bearings for rotating the mirror about the longitudinal axis, and the rotational forces may be applied to the mirror itself. Because the rotational axis is the longitudinal axis of the mirror, the mirror may transfer the rotational forces between the bearings, only one of which may be driving the rotation.

In some examples, the mirror may not engage the bearings directly. Rather, one or both bearings for rotating the mirror may include a seat that engages the top or bottom end of the mirror. The seat may be lightweight plastic or any other suitable material, and may take any shape that will engage the mirror and hold it between the bearings. For example, the seat may include at least one female coupling part, and the mirror may include a corresponding male coupling part. Other structures, such as snaps, clips, slots, or fasteners may be used.

An example single mirror assembly may also allow the freedom of movement necessary for the mirror to thermally expand, similar to that described above with respect to polygonal mirror assemblies. For example, the coupling parts may be sized such that when they are engaged, limited freedom of movement is possible in one or more directions. In other examples, at least one spring may be disposed between the mirror and at least one of the bearings, providing a constant force to keep the mirror in place between the bearings, but still allowing for the thermal expansion of the mirror in the vertical direction.

B. Example Embodiments

Figure 11:
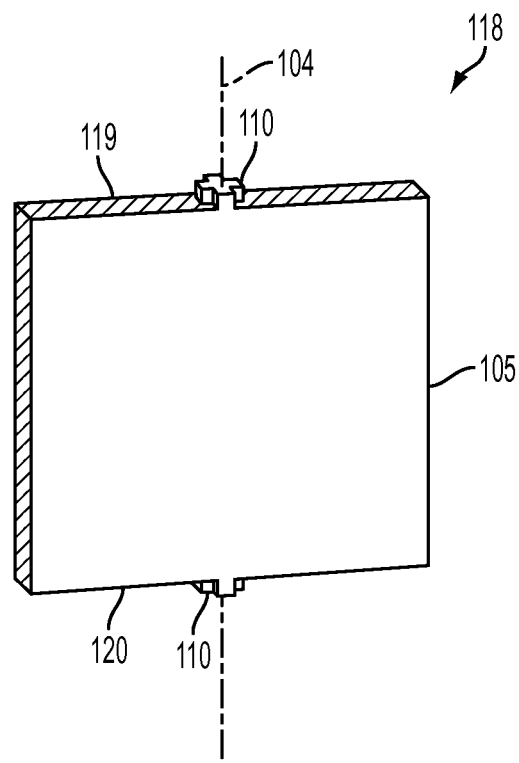
FIG. 11 shows a perspective view of an example single mirror assembly.

FIG. 11 shows an example single mirror assembly 118 including a top end 119, a bottom end 120, and two opposing reflective surfaces 105. The single mirror assembly 118 also includes a longitudinal axis 104 which intersects both the top and bottom ends 119, 120 and is co-planar with the plane defined by the single mirror assembly 118. The single mirror assembly 118 may be constructed of any material and may be of any thickness such that it is sufficiently lightweight, durable, and possesses suitable reflective properties. The example single mirror assembly 118 shown in FIG. 11 also includes male coupling parts 110 situated on the top and bottom ends 119, 120. The male coupling parts 110 are shown in the shape of a cross, and are positioned in line with the longitudinal axis 104 to facilitate the rotation of the mirror about the longitudinal axis once coupled with a set of bearings (not shown). Other shapes and locations for the male coupling parts 110 are also possible. Moreover, the top and bottom ends 119, 120 may be adapted to engage the set of bearings through the use of other structures as well, such as snaps, clips, slots, or fasteners.

It should be understood that, while particular example embodiments of single mirror assemblies are described above, these examples are provided for purposes of explanation only. Those of skill in the art will appreciate that various components, devices, and/or other elements may be added, removed, or interchanged without departing from the scope of the single mirror assemblies described herein. The examples described herein should not be taken to be limiting.

III. LIDAR SYSTEMS INCLUDING ROTATABLE MIRROR ASSEMBLIES

A. Overview

The example mirror assemblies described above may be used in an example optical scanning device, or in any other device that may implement a rotating polygonal or single mirror assembly. More specifically, and as noted in some of the previous examples, the mirror assemblies described above may be utilized in an example LIDAR system. In addition to the rotatable mirror assembly, the LIDAR system may also include at least one laser diode configured to emit a laser signal, and the mirror assembly may be positioned to redirect the laser signal, steering it through a desired field of view as it rotates. The laser signal may be aimed directly at the mirror assembly, or it may be reflected off of one of more additional reflective surfaces before it reaches the mirror assembly. Once the laser signal is steering through the field of view by the mirror assembly, the laser signal may reflect off of objects within the field of view.

When the emitted laser signal reflects off of objects within the field of view, a portion of the reflected signal may travel back to the LIDAR system. The example LIDAR system may further include at least one signal receiver configured to receive a reflected laser signal. The reflected laser signal may correspond to the emitted laser signal (as reflected off an object in the field of view), and may enable the system to determine pertinent information such as the peak intensity of the signal, and/or the flight time of the signal, among other examples. Such information may enable the LIDAR system to determine distances to objects located within in the field of view, among other information.

B. Example Embodiments

Figure 9A:
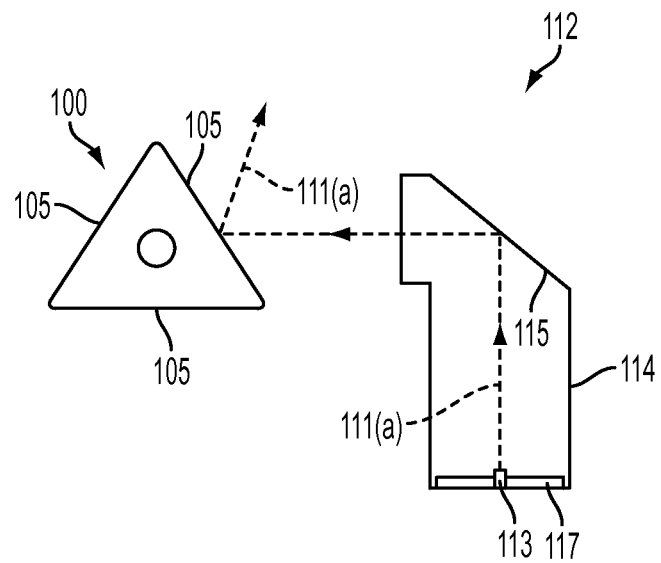
FIG. 9A shows an example LIDAR system including a polygonal mirror assembly at time 1.

FIG. 9A shows an example LIDAR system 112 including an example polygonal mirror assembly 100 at time 1. The system also includes a laser diode 113 which produces an emitted laser signal 111(a), the path of which is shown by a dashed line. The laser diode 113 is housed in an optical cavity 114. In the example shown in FIG. 9, the optical cavity 114 includes an internal surface 115 for directing the emitted light 111(a) toward the polygonal mirror assembly 100. The polygonal mirror assembly 100 rotates, steering the redirected light 112(a) through a field of view.

Figure 9B:
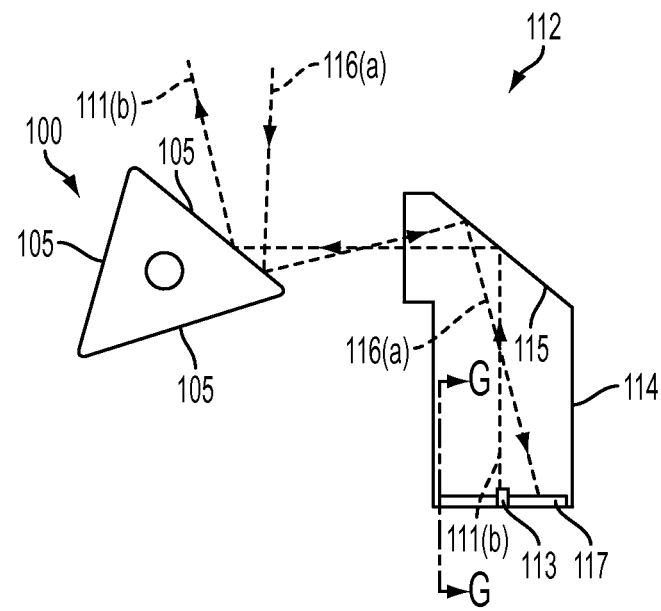
FIG. 9B shows an example LIDAR system including a polygonal mirror assembly at time 2.

FIG. 9B shows the example LIDAR system 112 shown in FIG. 9A, now at time 2. The polygonal mirror assembly 100 has rotated counter-clockwise, and continues to steer the emitted light 111(b) through the field of view. Also shown is the path of reflected light 116(a), which is the result of the emitted light 111(a), emitted at time 1, reflecting off of an object in the field of view and traveling back toward the LIDAR system 112. Reflected light 116(a) corresponds to emitted light 111(a), and may enable the system to determine pertinent information such as the total flight time of the light from time 1 to time 2, and the peak intensity of the light during that period, for example. The reflected light 116(a) is redirected by the polygonal mirror assembly 100 into the optical cavity 114, where it is received by a signal receiver 117. FIG. 9B also indicates the location of cross section G-G, which is shown in FIG. 10.

Figure 10:
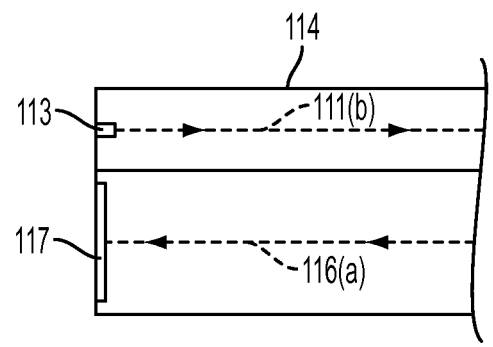
FIG. 10 shows cross section G-G, a partial side view of an example LIDAR system at time 2.

FIG. 10 shows cross section G-G, a partial side view taken from the inside of the optical cavity 114 at time 2. As the laser diode 113 produces emitted light 111(b), reflected light 116(a) returns through a different path within the optical cavity 114 to the signal receiver 117. Other arrangements for the optical cavity 114, including the placement and number of laser diodes 113 and signal receivers 117 are also possible.

In the examples shown in FIGS. 9B and 10, emitted light 111(b) is shown at time 2 simultaneously with reflected light 116(a). However, in some applications, the laser diode 113 may emit light in intermittent pulses, the timing of which may depend on the geometry and rotational velocity of the mirror assembly 100, among other factors. Therefore, it will be recognized that in some instances, the laser diode 113 may not always emit light at the same point in time that the LIDAR system 112 receives a reflected light signal.

Figure 12:
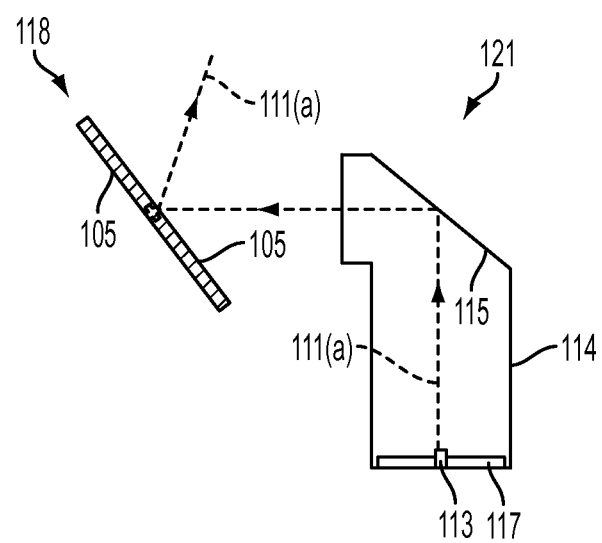
FIG. 12 shows an example LIDAR system including a single mirror assembly.

FIG. 12 shows an example LIDAR system 121 including an example single mirror assembly 118. The LIDAR system 121 includes many of the features shown in FIGS. 9A and 9B, including the laser diode 113, optical cavity 114, and signal receiver 117. The single mirror assembly 118 may rotate at a different frequency than a polygonal mirror assembly 100, and the laser diode 113 and signal receiver 117 may be configured to account for this difference. However, the light steering functions of the single mirror assembly 118 with respect to the emitted light 111 and reflected light 116 remain substantially the same, and thus the LIDAR system 121 functions similarly to those described above.

It should be understood that, while particular example embodiments of LIDAR systems are described above, these examples are provided for purposes of explanation only. Those of skill in the art will appreciate that various components, devices, and/or other elements may be added, removed, or interchanged without departing from the scope of the LIDAR systems described herein. The examples described herein should not be taken to be limiting.

III. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. An apparatus comprising:
a housing comprising a top end, a bottom end, and a longitudinal axis intersecting the top and bottom ends, wherein the top end of the housing and the bottom end of the housing each comprise one or more female coupling parts; and
a set of reflective surfaces, wherein each reflective surface is non-rigidly coupled to the top end of the housing and the bottom end of the housing by sizing the reflective surface to be smaller than a vertical distance between the top end and bottom end and including at least one male coupling part that extends vertically from the reflective surface into a corresponding one of the female coupling parts at the top end of the housing and at least one male coupling part that extends vertically from the reflective surface into a corresponding one of the female coupling parts at the bottom end of the housing, such that each reflective surface possesses limited freedom of vertical movement with respect to the housing.

2. The apparatus of claim 1,
wherein each male coupling part is sized to be smaller than the corresponding female coupling part such that a corresponding reflective surface possesses limited freedom of lateral movement with respect to the housing.

3. The apparatus of claim 2 further comprising at least one spring disposed between each reflective surface and the housing,
wherein each male coupling part is further sized to be smaller than the corresponding female coupling part such that the corresponding reflective surface possesses freedom of movement towards and away from a center of the housing,
wherein the at least one spring provides resistance against movement of the corresponding reflective surface towards the center of the housing.

4. The apparatus of claim 1 wherein each reflective surface defines a respective plane, and wherein each reflective surface is non-rigidly coupled to the housing such that the respective plane of each reflective surface is positioned at a different angle to the longitudinal axis.

5. The apparatus of claim 1 wherein each reflective surface does not contact any other reflective surface in the set.

6. A light-detection and ranging (LIDAR) system comprising:
a mirror assembly, the mirror assembly comprising:
a housing comprising a top end, a bottom end, and a longitudinal axis intersecting the top and bottom ends, wherein the top end of the housing and the bottom end of the housing each comprise one or more female coupling parts; and
a set of reflective surfaces, wherein each reflective surface is non-rigidly coupled to the top end of the housing and the bottom end of the housing by sizing the reflective surface to be smaller than a vertical distance between the top end and bottom end and including at least one male coupling part that extends vertically from the reflective surface into a corresponding one of the female coupling parts at the top end of the housing and at least one male coupling part that extends vertically from the reflective surface into a corresponding one of the female coupling parts at the bottom end of the housing, such that each reflective surface possesses limited freedom of vertical movement with respect to the housing;
at least one laser diode configured to emit a laser signal, wherein the mirror assembly is positioned to redirect the laser signal; and
at least one signal receiver configured to receive a reflected laser signal, wherein the reflected laser signal corresponds to the emitted laser signal.

7. The system of claim 6, wherein each male coupling part is sized to be smaller than the corresponding female coupling part such that a corresponding reflective surface possesses limited freedom of lateral movement with respect to the housing.

8. The system of claim 7 further comprising:
a set of springs disposed between each reflective surface and either the top end of the housing or the bottom end of the housing, wherein each spring constrains movement of a corresponding reflective surface towards the center of the housing,
wherein each spring is disposed such that a middle portion of the spring contacts the corresponding reflective surface to constrain movement of the corresponding reflective surface towards the center of the housing.

9. The system of claim 6 wherein each reflective surface defines a respective plane, and wherein each reflective surface is non-rigidly coupled to the housing such that the respective plane of each reflective surface is at a different angle to the longitudinal axis.

10. The system of claim 6 wherein each reflective surface does not contact any other reflective surface in the set.

11. The system of claim 6, wherein each male coupling part is further sized to be smaller than the corresponding female coupling part such that the corresponding reflective surface possesses freedom of movement towards and away from a center of the housing.

12. The system of claim 11, further comprising at least one spring disposed between each reflective surface and the housing, wherein the at least one spring provides resistance against movement of the corresponding reflective surface towards the center of the housing.

13. A method comprising:
    emitting, via at least one laser diode, a laser signal;
    redirecting the emitted laser signal via a mirror assembly, the mirror assembly comprising:
        a housing comprising a top end, a bottom end, and a longitudinal axis intersecting the top and bottom ends, wherein the top end of the housing and the bottom end of the housing each comprise one or more female coupling parts; and
        a set of reflective surfaces, wherein each reflective surface is non-rigidly coupled to the top end of the housing and the bottom end of the housing by sizing the reflective surface to be smaller than a vertical distance between the top end and bottom end and including at least one male coupling part that extends vertically from the reflective surface into a corresponding one of the female coupling parts at the top end of the housing and at least one male coupling part that extends vertically from the reflective surface into a corresponding one of the female coupling parts at the bottom end of the housing, such that each reflective surface possesses limited freedom of vertical movement with respect to the housing; and
    receiving, via at least one signal receiver, a reflected laser signal, wherein the reflected laser signal corresponds to the emitted laser signal.

14. The method of claim 13,
    wherein each male coupling part is sized to be smaller than the corresponding female coupling part such that a corresponding reflective surface possesses limited freedom of lateral movement with respect to the housing.

15. The method of claim 14 wherein the mirror assembly further comprises at least one spring disposed between each reflective surface and the housing,
    wherein each male coupling part is further sized to be smaller than the corresponding female coupling part such that the corresponding reflective surface possesses freedom of movement towards and away from a center of the housing,
    wherein the at least one spring provides resistance against movement of the corresponding reflective surface towards the center of the housing.

16. The method of claim 13 wherein each reflective surface defines a respective plane, and wherein each reflective surface is non-rigidly coupled to the housing such that the respective plane of each reflective surface is positioned at a different angle to the longitudinal axis.

17. The method of claim 13 wherein each reflective surface does not contact any other reflective surface in the set.

18. The apparatus of claim 1 wherein the limited freedom of vertical movement with respect to the housing for each reflective surface is less than one millimeter.

19. The system of claim 6 wherein the limited freedom of vertical movement with respect to the housing for each reflective surface is less than one millimeter.

20. The method of claim 13 wherein the limited freedom of vertical movement with respect to the housing for each reflective surface is less than one millimeter.

* * * * *